(12) United States Patent
Pal et al.

(10) Patent No.: US 12,298,947 B2
(45) Date of Patent: May 13, 2025

(54) MACHINE-LEARNING BASED GENERATION OF DATABASE CONFIGURATIONS FOR DATABASES ASSOCIATED WITH APPLICATIONS

(71) Applicant: Dell Products L.P., Round Rock, TX (US)

(72) Inventors: Bhupendra Kumar Pal, Noida (IN); Abhishek Mishra, Bangalore (IN); Praveena K S, Thrissur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/240,643

(22) Filed: Aug. 31, 2023

(65) Prior Publication Data

US 2025/0077482 A1  Mar. 6, 2025

(51) Int. Cl.
*G06F 16/21* (2019.01)
*G06F 16/22* (2019.01)

(52) U.S. Cl.
CPC ........ *G06F 16/213* (2019.01); *G06F 16/2282* (2019.01)

(58) Field of Classification Search
CPC ............................ G06F 16/213; G06F 16/2282
See application file for complete search history.

(56) References Cited

U.S. PATENT DOCUMENTS

2009/0125920 A1* 5/2009 Leff .................... G06F 9/547
                                                        719/330
2014/0317045 A1* 10/2014 Quine .................. G06F 16/212
                                                        707/601
2017/0115968 A1* 4/2017 Fukala .................... G06F 16/25
2019/0250891 A1* 8/2019 Kumar ...................... G06T 7/70
2021/0064361 A1* 3/2021 Jayaraman ............. G06N 20/10
(Continued)

OTHER PUBLICATIONS

Microsoft, "AI Lab Projects," https://www.microsoft.com/en-us/ai/ai-lab-sketch2code#:~:text=Sketch2Code%20uses%20AI%20to%20convert,Try%20out%20Sketch2Code, Accessed Aug. 10, 2023, 5 pages.

(Continued)

*Primary Examiner* — Grace Park
(74) *Attorney, Agent, or Firm* — Ryan, Mason & Lewis, LLP (57) ABSTRACT

An apparatus comprises at least one processing device configured to obtain information characterizing a user interface (UI) of an application, the obtained information comprising an image of the UI and textual data associated with the UI. The processing device is also configured to generate, by processing the image utilizing a first machine learning model, a first data structure characterizing data fields corresponding to UI components in the UI. The processing device is further configured to generate, by processing the textual data utilizing a second machine learning model, a second data structure characterizing relationships between the data fields. The processing device is further configured to determine, based on the first and second data structures, a database configuration comprising an organization of the data fields into tables for a database associated with the application. The processing device is further configured to generate the database in accordance with the determined database configuration.

20 Claims, 8 Drawing Sheets

(56) References Cited

U.S. PATENT DOCUMENTS

2022/0091968 A1* 3/2022 Kumar .................. G06F 11/368
2022/0413997 A1* 12/2022 Shi ........................ G06N 20/00

OTHER PUBLICATIONS

Figma, "How you Design, Align, and Build Matters," https://www.figma.com/, Accessed Aug. 10, 2023, 8 pages.
M. Rae, "What is Adobe XD and What is it Used for?" https://www.adobe.com/products/xd/learn/get-started/what-is-adobe-xd-used-for.html, Oct. 26, 2020, 25 pages.
Mathworks, "VGG-16 Convolutional Neural Network," https://www.mathworks.com/help/deeplearning/ref/vgg16.html, Accessed Aug. 10, 2023, 4 pages.
Mathworks, "ResNet-50 Convolutional Neural Network," https://www.mathworks.com/help/deeplearning/ref/resnet50.html, Accessed Aug. 10, 2023, 3 pages.

\* cited by examiner

| | 300 |
|---|---|
| USER INTERFACE (UI) MOCKUPS | HIGH-QUALITY UI MOCKUPS, CREATED BY PROFESSIONAL DESIGNERS, ARE USED TO TRAIN THE COMPUTER VISION MODELS THAT WILL RECOGNIZE UI COMPONENTS AND EXTRACT RELEVANT INFORMATION. |
| TEXT ANNOTATIONS | TEXT ANNOTATIONS PROVIDE ADDITIONAL INFORMATION ABOUT UI COMPONENTS, SUCH AS LABELS AND FIELD NAMES. THE ANNOTATIONS MAY BE IN THE FORM OF NATURAL LANGUAGE TEXT, WHICH WILL BE PROCESSED USING NATURAL LANGUAGE PROCESSING (NLP) TECHNIQUES. |
| LABELS | LABELS HELP TO IDENTIFY THE PURPOSE OF UI COMPONENTS, SUCH AS INPUT FIELDS OR BUTTONS. THESE LABELS MAY BE USED TO CATEGORIZE UI COMPONENTS, AND CAN ALSO BE PROCESSED USING NLP TECHNIQUES. |
| RELATIONSHIPS | RELATIONSHIPS BETWEEN UI COMPONENTS, SUCH AS PARENT-CHILD RELATIONSHIPS OR ASSOCIATIONS BETWEEN INPUT FIELDS AND DATA ENTITIES, ARE IDENTIFIED AND LABELLED. THIS DATA CAN BE USED TO GENERATE THE DATABASE SCHEMA. |
| USER FEEDBACK | USER FEEDBACK ON THE ACCURACY OF THE GENERATED DATABASE SCHEMA MAY BE COLLECTED TO FINE-TUNE THE SYSTEM AND IMPROVE ITS PERFORMANCE OVER TIME. |
| EXISTING DATABASES | EXISTING DATABASES MAY BE USED TO TRAIN THE MACHINE LEARNING ALGORITHMS THAT CLUSTER AND CLASSIFY UI COMPONENTS, AND TO GENERATE THE DATABASE SCHEMA. |
| RELEVANT DOMAIN KNOWLEDGE FROM SUBJECT MATTER EXPERTS (SMEs) | RELEVANT DOMAIN KNOWLEDGE MAY BE USED TO FINE-TUNE THE SYSTEM AND IMPROVE ITS ACCURACY. THIS MAY INCLUDE KNOWLEDGE OF DATABASE DESIGN PRINCIPLES, UI DESIGN BEST PRACTICES, AND SOFTWARE ENGINEERING CONCEPTS. |

| | |
|---|---|
| DATA CLEANING | DATA CLEANING INVOLVES REMOVING ANY IRRELEVANT OR NOISY DATA FROM THE DATASET. THIS MAY INVOLVE REMOVING UI COMPONENTS THAT ARE NOT RELEVANT TO THE DATABASE SCHEMA, REMOVING LABELS THAT ARE MISSPELLED OR INCORRECT. IT IS ALSO IMPORTANT TO IDENTIFY AND REMOVE ANY DUPLICATE DATA POINTS. |
| FEATURE EXTRACTION | FEATURE EXTRACTION INVOLVES IDENTIFYING AND EXTRACTING RELEVANT FEATURES FROM THE DATA THAT WILL BE USED AS INPUTS TO THE MACHINE LEARNING ALGORITHMS. FEATURES MAY INCLUDE THE POSITION, SIZE, AND COLOR OF UI COMPONENTS, AS WELL AS THE TEXT OF LABELS AND ANNOTATIONS. |
| DATA NORMALIZATION | DATA NORMALIZATION INVOLVES SCALING THE DATA TO A COMMON RANGE, TO ENSURE THAT EACH FEATURE IS WEIGHTED EQUALLY IN THE MACHINE LEARNING ALGORITHMS. THIS IS IMPORTANT TO PREVENT ONE FEATURE FROM DOMINATING THE OTHERS AND SKEWING THE RESULTS. |
| DIMENSIONALITY REDUCTION | DIMENSIONALITY REDUCTION TECHNIQUES CAN BE USED TO REDUCE THE NUMBER OF FEATURES IN THE DATASET, WHILE PRESERVING THE MOST IMPORTANT INFORMATION, WHICH CAN IMPROVE THE EFFICIENCY AND ACCURACY. DIMENSIONALITY REDUCTION TECHNIQUES MAY BE USED TO REDUCE THE NUMBER OF FEATURES EXTRACTED FROM THE UI MOCKUPS AND ANNOTATIONS. |

MACHINE-LEARNING BASED GENERATION OF DATABASE CONFIGURATIONS FOR DATABASES ASSOCIATED WITH APPLICATIONS

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for machine learning-based generation of database configurations for databases associated with applications.

In one embodiment, an apparatus comprises at least one processing device comprising a processor coupled to a memory. The at least one processing device is configured to obtain information characterizing a user interface of an application, the obtained information comprising at least one image of at least a portion of the user interface of the application and textual data associated with the user interface of the application. The at least one processing device is also configured to generate, by processing the at least one image utilizing at least a first machine learning model in a machine learning system implemented by the processor and the memory of the at least one processing device, a first data structure characterizing two or more data fields corresponding to user interface components in the user interface of the application. The at least one processing device is further configured to generate, by processing the textual data associated with the user interface of the application utilizing at least a second machine learning model in the machine learning system implemented by the processor and the memory of the at least one processing device, a second data structure characterizing relationships between the two or more data fields corresponding to the user interface components in the user interface of the application. The at least one processing device is further configured to determine, based at least in part on the first data structure and the second data structure, a database configuration for a database associated with the application, the database configuration comprising an organization of the two or more data fields into one or more tables. The at least one processing device is further configured to generate the database associated with the application in accordance with the determined database configuration.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
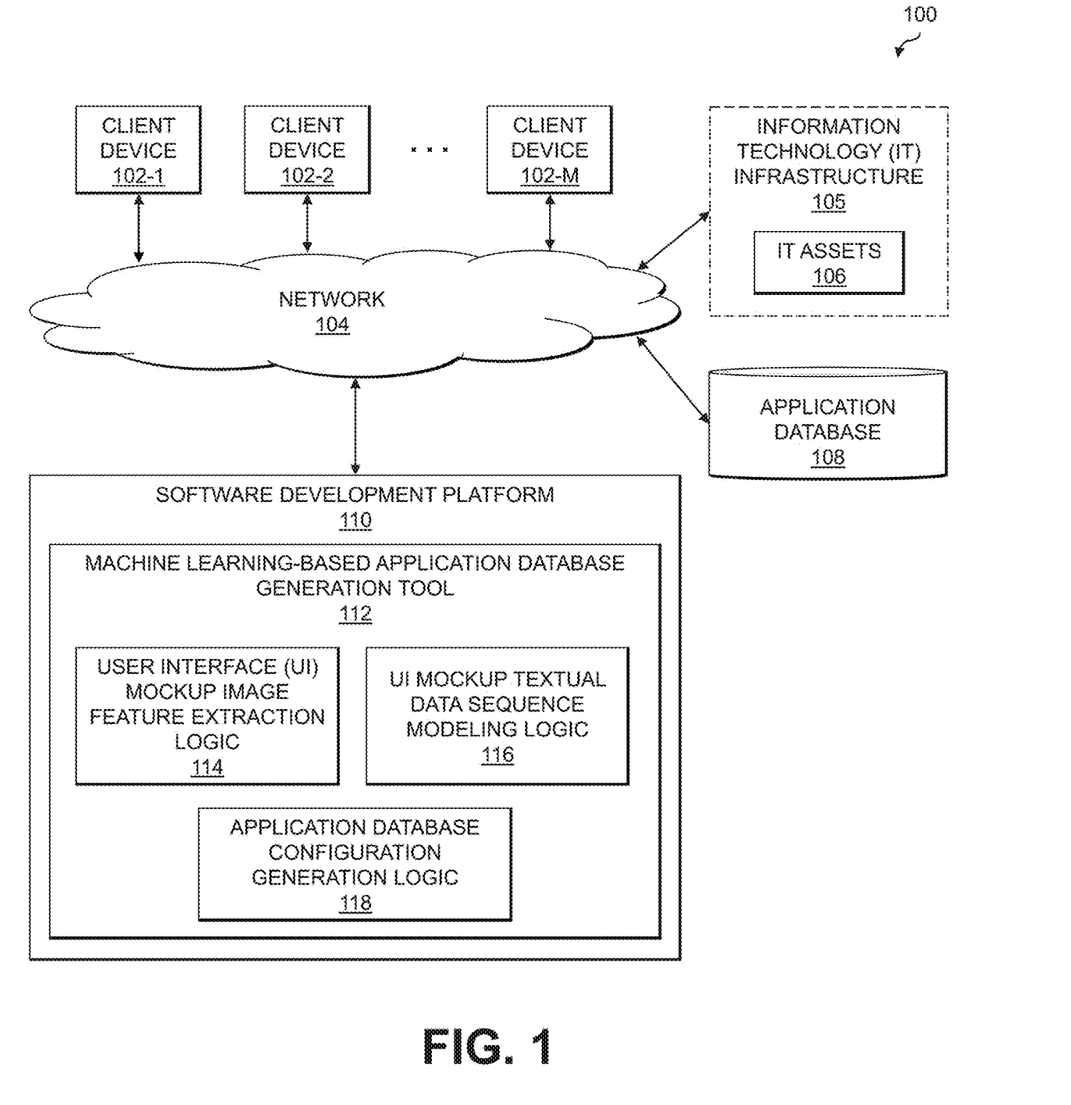
FIG. 1 is a block diagram of an information processing system configured for machine learning-based generation of database configurations for databases associated with applications in an illustrative embodiment.

FIG. 1 shows an information processing system 100 configured in accordance with an illustrative embodiment. The information processing system 100 is assumed to be built on at least one processing platform and provides functionality for machine learning-based generation of database configurations for databases associated with applications. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an application database 108, and a software development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the software development platform 110 is used for an enterprise system. For example, an enterprise may subscribe to or otherwise utilize the software development platform 110 for managing application or other software builds which are developed by users of that enterprise (e.g., software developers or other employees, customers or users which may be associated with different ones of the client devices 102 and/or IT assets 106 of the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The application database 108 is configured to store and record various information that is utilized by the software development platform 110. Such information may include, for example, user interface (UI) mockup images for applications, along with associated textual annotations and labels. In some embodiments, one or more storage systems utilized to implement the application database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software development platform 110, as well as to support communication between the software development platform 110 and other related systems and devices not explicitly shown.

The software development platform 110 may be provided as a cloud service that is accessible by one or more of the client devices 102 to allow users thereof to manage generation of database configurations (e.g., database structure schema) for applications or other software. The client devices 102 may be configured to access or otherwise utilize the IT infrastructure 105, such as to deploy generated software builds on one or more of the IT assets 106. In some embodiments, the client devices 102 are assumed to be associated with software developers, system administrators, IT managers or other authorized personnel responsible for managing application or other software development for an enterprise. In some embodiments, the IT assets 106 of the IT infrastructure 105 are owned or operated by the same enterprise that operates the software development platform 110. In other embodiments, the IT assets 106 of the IT infrastructure 105 may be owned or operated by one or more enterprises different than the enterprise which operates the software development platform 110 (e.g., a first enterprise provides support for software builds and software component data structure generation for multiple different customers, business, etc.). Various other examples are possible.

In some embodiments, the client devices 102 and/or the IT assets 106 of the IT infrastructure 105 may implement host agents that are configured for automated transmission of information with the software development platform 110 regarding development of a particular application or other piece of software and/or its associated database structure schema. It should be noted that a "host agent" as this term is generally used herein may comprise an automated entity, such as a software entity running on a processing device. Accordingly, a host agent need not be a human entity.

The software development platform 110 in the FIG. 1 embodiment is assumed to be implemented using at least one processing device. Each such processing device generally comprises at least one processor and an associated memory, and implements one or more functional modules or logic for controlling certain features of the software development platform 110. In the FIG. 1 embodiment, the software development platform 110 implements a machine learning-based application database generation tool 112. The machine learning-based application database generation tool 112 comprises UI mockup image feature extraction logic 114, UI mockup textual data sequence modeling logic 116, and application database configuration generation logic 118. The machine learning-based application database generation tool 112 is configured to obtain information characterizing a UI of an application. The obtained information comprising at least one image of at least a portion of the UI of the application (e.g., UI mockup images) and textual data associated with the user interface of the application (e.g., annotations and/or labels, which may be overlayed on the UI mockup images). The UI mockup image feature extraction logic 114 is configured to process the at least one image using a first machine learning model to generate a first data structure characterizing two or more data fields corresponding to UI components in the UI of the application. The UI mockup textual data sequence modeling logic 116 is configured to process the textual data associated with the UI of the application using a second machine learning model to generate a second data structure characterizing relationships between the two or more data fields corresponding to the UI components in the UI of the application. The application database configuration generation logic 118 is configured to determine, based at least in part on the first data structure and the second data structure, a database configuration for a database associated with the application, the database configuration comprising an organization of the two or more data fields into one or more tables. The application database configuration generation logic 118 is further configured to generate the database associated with the application in accordance with the determined database configuration.

At least portions of the machine learning-based application database generation tool 112, the UI mockup image feature extraction logic 114, the UI mockup textual data sequence modeling logic 116, and the application database configuration generation logic 118 may be implemented at least in part in the form of software that is stored in memory and executed by a processor.

It is to be appreciated that the particular arrangement of the client devices 102, the IT infrastructure 105, the application database 108 and the software development platform 110 illustrated in the FIG. 1 embodiment is presented by way of example only, and alternative arrangements can be used in other embodiments. As discussed above, for example, the software development platform 110 (or portions of components thereof, such as one or more of the machine learning-based application database generation tool 112, the UI mockup image feature extraction logic 114, the UI mockup textual data sequence modeling logic 116, and the application database configuration generation logic 118) may in some embodiments be implemented internal to one or more of the client devices 102 and/or the IT infrastructure 105.

The software development platform 110 and other portions of the information processing system 100, as will be described in further detail below, may be part of cloud infrastructure.

The software development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the application database 108 and the software development platform 110 or components thereof (e.g., the machine learning-based application database generation tool 112, the UI mockup image feature extraction logic 114, the UI mockup textual data sequence modeling logic 116, and the application database configuration generation logic 118) may be implemented on respective distinct processing platforms, although numerous other arrangements are possible. For example, in some embodiments at least portions of the software development platform 110 and one or more of the client devices 102, the IT infrastructure 105 and/or the application database 108 are implemented on the same processing platform. A given client device (e.g., 102-1) can therefore be implemented at least in part within at least one processing platform that implements at least a portion of the software development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the application database 108 and the software development platform 110, or portions or components thereof, to reside in different data centers. Numerous other distributed implementations are possible. The software development platform 110 can also be implemented in a distributed manner across multiple data centers.

Additional examples of processing platforms utilized to implement the software development platform 110 and other components of the information processing system 100 in illustrative embodiments will be described in more detail below in conjunction with FIGS. 7 and 8.

It is to be understood that the particular set of elements shown in FIG. 1 for machine learning-based generation of database configurations for databases associated with applications is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based generation of database configurations for databases associated with applications will now be described in more detail with reference to the flow diagram of FIG. 2. It is to be understood that this particular process is only an example, and that additional or alternative processes for machine learning-based generation of database configurations for databases associated with applications may be used in other embodiments.

In this embodiment, the process includes steps 200 through 208. These steps are assumed to be performed by the software development platform 110 utilizing the machine learning-based application database generation tool 112, the UI mockup image feature extraction logic 114, the UI mockup textual data sequence modeling logic 116, and the application database configuration generation logic 118. The process begins with step 200, obtaining information characterizing a UI of an application. The obtained information comprises at least one image of at least a portion of the UI of the application and textual data associated with the UI of the application. The at least one image may comprise a UI mockup of the application. The textual data associated with the UI of the application may comprise at least one of one or more annotations and one or more labels associated with respective ones of the UI components in the UI of the application. The one or more annotations and the one or more labels may be overlayed on a UI mockup of the application.

In step 202, a first data structure is generated by processing the at least one image utilizing at least a first machine learning model in a machine learning system. The first data structure characterizes two or more data fields corresponding to UI components in the UI of the application. In step 204, a second data structure is generated by processing the textual data associated with the UI of the application utilizing at least a second machine learning model in the machine learning system. The second data structure characterizes relationships between the two or more data fields corresponding to the UI components in the UI of the application. The first machine learning model may comprise a computer vision machine learning model and the second machine learning model may comprise a natural language processing (NLP) machine learning model. The first data structure may characterize at least one of relationships and relative positions of different ones of the UI components in the UI of the application. The first machine learning model may comprise: at least one classifier configured to predict classes of the UI components; and at least one regression model configured to predict properties of the UI components. The first machine learning model may comprise a convolutional neural network (CNN) model, and the first data structure may comprise an output of a convolutional layer of the CNN model. The second machine learning model may comprise a recurrent neural network (RNN) model. The RNN model may utilize at least one of one or more Long Short Term Memory (LSTM) units and one or more Gated Recurrent Units (GRUs).

Figure 2:
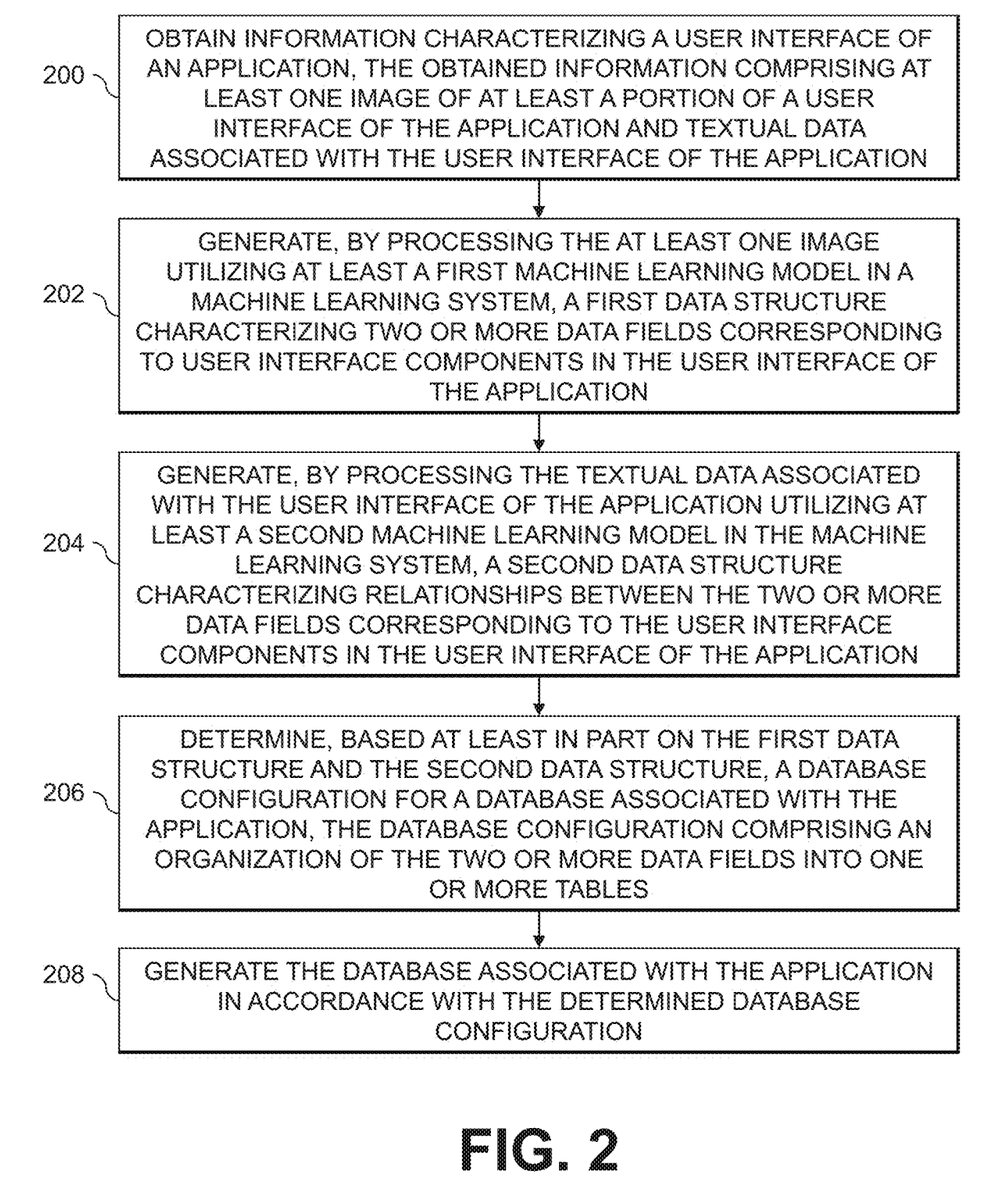
FIG. 2 is a flow diagram of an exemplary process for machine learning-based generation of database configurations for databases associated with applications in an illustrative embodiment.

The FIG. 2 process continues with step 206, determining a database configuration for a database associated with the application based at least in part on the first data structure and the second data structure. The database configuration comprises an organization of the two or more data fields into one or more tables. In step 208, the database associated with the application is generated in accordance with the determined database configuration. Step 206 may comprise generating a combined representation of the first data structure and the second data structure, and processing the combined representation of the first data structure and the second data structure utilizing one or more fully connected (FC) layers of the machine learning system. Generating the combined representation may comprise concatenating the first data structure and the second data structure, performing an element-wise multiplication of first elements of the first data structure and second elements of the second data structure, combinations thereof, etc.

In modern application design, databases play a crucial role in managing and organizing the data that applications rely on. With the explosion in the amount of data, and the need to store, retrieve and analyze large volumes of data, databases have become important components of most modern applications. The importance of databases in modern applications will be discussed in further detail below, along with the need for structured databases that are optimized and error-free.

Databases provide a structured and organized way to store and manage data. With the help of databases, applications can store and retrieve data in a structured and consistent manner. Databases ensure data consistency, integrity, and security. Databases can handle large volumes of data, and provide fast and efficient ways to retrieve data, even when working with large amounts of data. Databases also provide powerful data analysis tools, such as Structured Query Language (SQL) queries, to help applications analyze and make sense of their data. These tools allow applications to query a database and retrieve specific data sets based on certain criteria. This can help applications to gain insights into their data and make better decisions. Databases can further be scaled up or down depending on the needs of the application. With the ability to handle increasing amounts of data or users as an application grows, databases provide the necessary flexibility for applications to adapt to changing needs.

In addition to the above-mentioned benefits, it is important to have structured databases that are optimized and error-free. Structured databases ensure that data is stored in a consistent manner, making it easier for applications to retrieve and analyze the data. Databases that are not structured can lead to confusion and errors, making it difficult for applications to access the necessary data. Furthermore, optimized databases can provide faster and more efficient data retrieval, reducing the amount of time it takes for applications to access the data. This can improve application performance and user experience. Additionally, error-free databases can prevent data loss and corruption, ensuring that the data remains accurate and reliable.

It can thus be seen that databases are a critical component of modern application design. Databases provide a structured and organized way to store and manage data, powerful data analysis tools, and necessary scalability for applications to adapt to changing needs. Optimized and error-free databases ensure efficient data retrieval, accurate data analysis, and reliable data storage.

Designing and implementing a database schema that reflects the user interface (UI) design of an application relies heavily on manual effort. In a conventional approach, designing and implementing the database schema involves a significant amount of time and effort to manually map out the relationships between UI components and translate them into a structured database schema. This process is not only time consuming, but is also error-prone and can result in discrepancies between the original UI design and the final database schema. Illustrative embodiments provide technical solutions for automatically designing a structured database schema from a UI mockup, text annotations, and labels. The technical solutions are thus advantageously able to significantly reduce the manual effort required to design and implement a database schema. This can improve the productivity and quality of software development processes, allowing developers to focus on higher-level tasks such as implementing functional logic and improving the user experience. The technical solutions can also advantageously ensure that a generated database schema accurately reflects the UI design, reducing the risk of errors and inconsistencies that can occur in manual mapping processes. This can improve the overall quality and reliability of software products, reducing the need for costly and time-consuming maintenance activities. The technical solutions thus provide various technical advantages, solving technical problems through reducing or eliminating manual effort and errors in designing and implementing a database schema that reflects an application's UI design. This improves the productivity and quality of software development processes, reducing the risk of errors and inconsistencies.

In some embodiments, a deep learning-based system is configured to extract relevant features from UI mockups and textual annotations, and to use such extracted features to automatically generate a structured database schema that reflects the UI design. The technical solutions overcome various technical challenges in order to develop accurate and efficient computer vision and natural language processing (NLP) models. Such models are integrated to produce a coherent output, and ensure that a structured database schema generated utilizing such models conforms to industry standards and best practices. The technical solutions collect and preprocess a large and diverse dataset of UI mockups, text annotations and labels, and use such information to develop and train one or more deep learning models. Performance of the trained deep learning models is evaluated. If performance is acceptable (e.g., above some designated threshold of accuracy), the trained deep learning models are integrated into software development workflows. The success of a software development project may be measured in terms of the accuracy, efficiency and scalability of the system, as well as its ability to improve the productivity and quality of the software development process.

The technical solutions described herein use computer vision techniques to extract information from a UI mockup. The extracted information may include, for example, the locations of different UI components, the sizes of different UI components, the relationships between different UI components, etc. This information may be used to generate a schema for the database. The technical solutions described herein also utilize NLP techniques to extract information from text labels and annotations in the UI mockup. For example, if a UI mockup includes a label that says "Product Name," a NLP model could infer that this is a field in the database schema.

Using a combination of a UI mockup, text annotations, and labels with a tandem of NLP and computer vision techniques can improve the accuracy and reliability of software development systems. By combining these approaches, the strengths of each approach are leveraged to better understand the UI mockup and extract the necessary information for generating a structured database schema for an application. Computer vision components help to identify and locate different UI components and their relationships with one another. A computer vision component, for example, can recognize objects such as tables, their relationships to one another, their relative positions in a UI mockup, etc. This can help to generate a visual representation of the UI mockup and provide important context for NLP components. The NLP components can analyze text labels and annotations associated with UI components. An NLP component can identify key phrases and terms that indicate the type of data that needs to be stored in the database for an application (e.g., "product name," "price," "customer ID," etc.). The NLP component can also identify relationships between different data fields, such as "one-to-many" or "many-to-many" relationships.

The technical solutions described herein are able to understand user context based on the UI mockup, and use a large dataset of UI mockups to train one or more machine learning models. The data collection process involves collecting a large and diverse dataset of UI mockups, text annotations and labels that is representative of a target domain. The dataset is then preprocessed by extracting relevant features from the UI mockups using computer vision techniques, and extracting relevant textual information from the text annotations and labels using NLP techniques. The preprocessed data is then transformed into numerical vectors suitable for input into one or more machine learning models.

Figure 3:
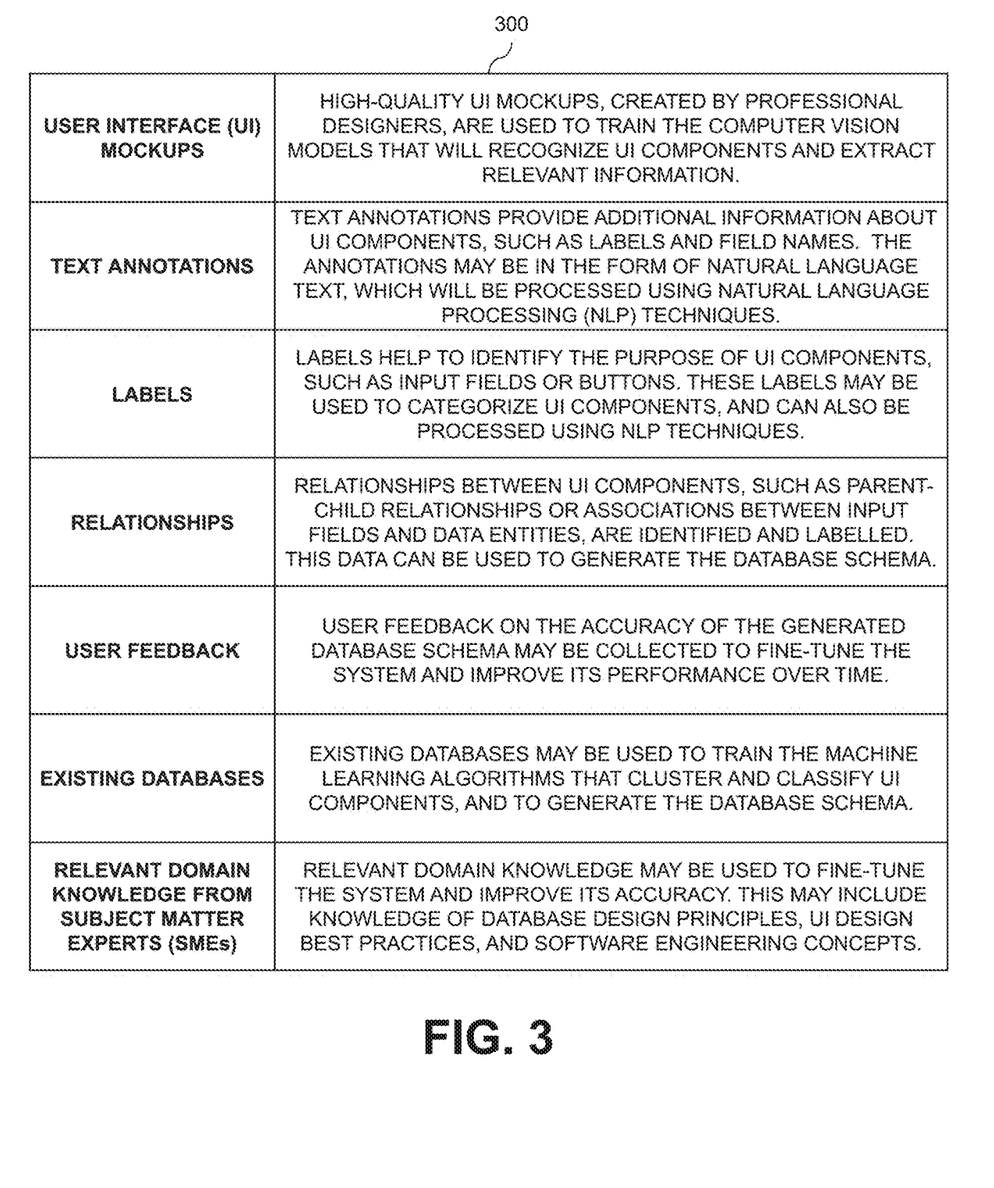
FIG. 3 shows a table of data sources for predicting application database structure schema in an illustrative embodiment.
Figure 4:
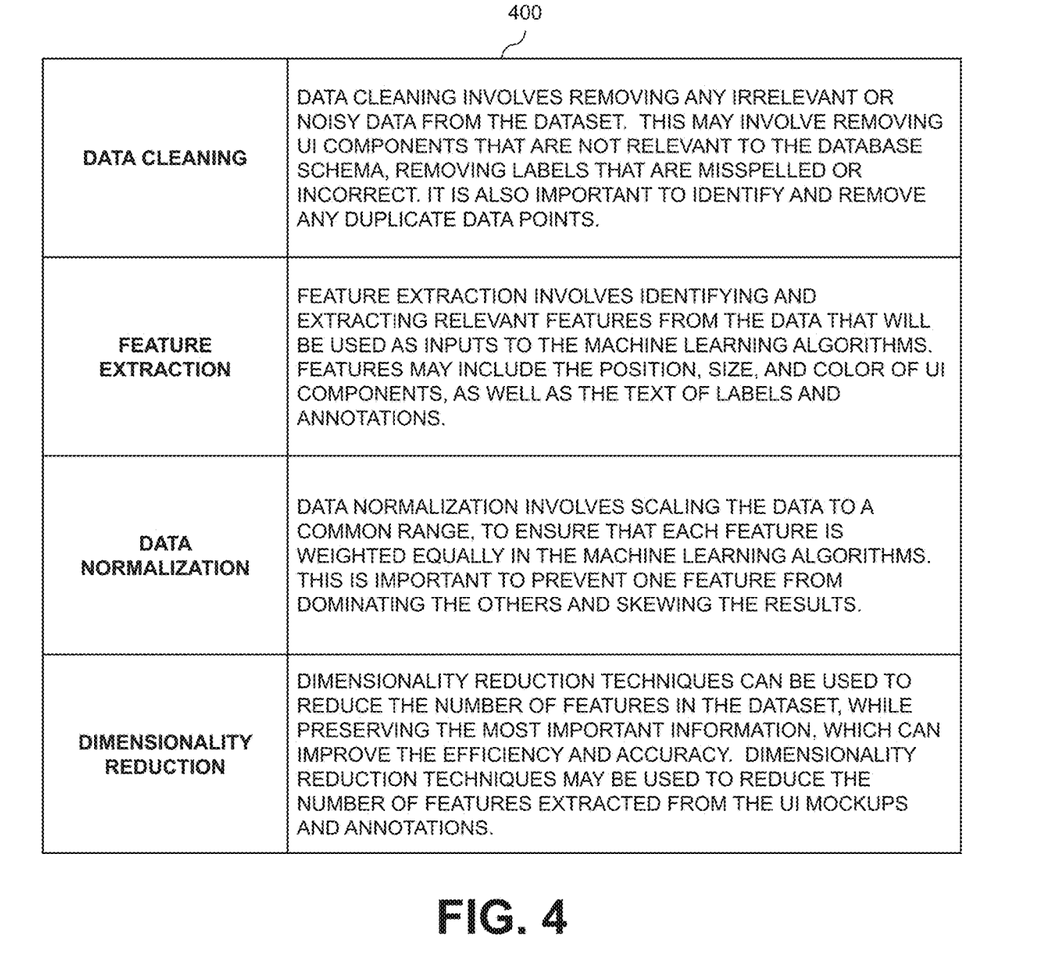
FIG. 4 shows a table of data preprocessing techniques which may be applied to user interface mockups used in predicting application database structure schema in an illustrative embodiment.

Data gathering includes collecting a large and diverse dataset of UI mockups, text annotations and labels that are representative of a target domain. The quality and accuracy of the data collected is critical to success of the system. Diverse UI mockups generated by various tools (e.g., Figma, Adobe XD) and hand drawings including annotations, accurate labels, relationships and relevant domain knowledge will be used to train and fine-tune machine learning algorithms to ensure the accuracy of generated database schema. The dataset may be collected from various sources, such as design repositories, crowdsourcing platforms, manually created datasets, etc. FIG. 3 shows a table 300 of various information that is gathered and used for training machine learning models, including UI mockups, text annotations, labels, relationships, user feedback, existing databases, and relevant domain knowledge from one or more subject matter experts (SMEs). Data treatment or preprocessing is performed on the gathered data. Data treatment and preprocessing may include, for example, data cleaning, feature extraction, data normalization, and dimensionality reduction. FIG. 4 shows a table 400 describing such data treatment and preprocessing approaches. Once the data is gathered and preprocessed, it is used to create machine learning models. In some embodiments, the machine learning models include: (i) a computer vision model that can recognize different UI components and their relationships with one another; and (ii) an NLP model that can analyze the text labels and annotations associated with UI components to extract the relevant information. The computer vision and NLP models may be combined to create a deep learning system that can analyze a UI mockup and associated text to generate a structured database schema for an application.

Once the data is available and preprocessed, a machine learning system is created. In some embodiments, the machine learning system uses a combination of one or more Convolutional Neural Networks (CNNs) and one or more Recurrent Neural Networks (RNNs) for automatically designing a structured database from a UI mockup, text annotations, and labels. By using a combination of CNNs and RNNs, the strengths of both architectures are leveraged to design a powerful model for automatically designing structured databases from UI mockups, text annotations, and labels. The CNNs may be used to extract the visual features from the UI mockup, while the RNNs can model the temporal dependencies between the text annotations and the labels. Together, these features can be combined and used to make accurate predictions about the structure of the database for an application.

Figure 5:
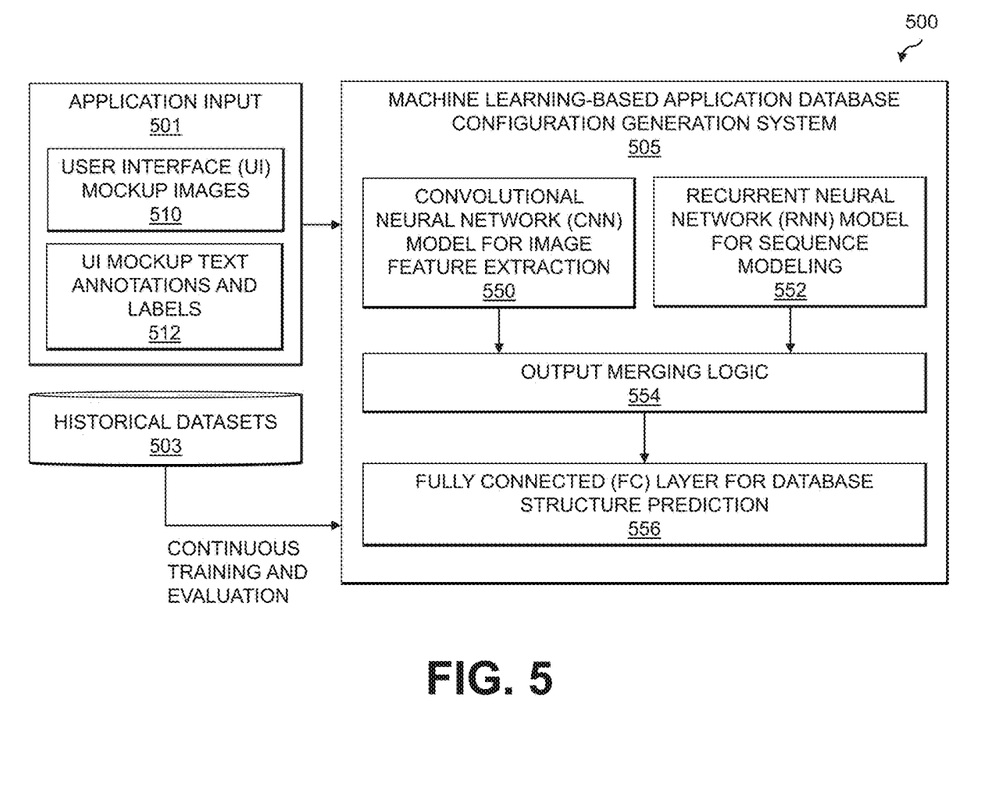
FIG. 5 shows a system implementing a deep learning architecture for machine learning-based generation of application database structure schema in an illustrative embodiment.

FIG. 5 shows a system 500 including a machine learning-based application database configuration generation system 505, which operates on application input 501 including UI mockup images 510 and UI mockup annotations and labels 512. The machine learning-based application database configuration generation system 505 implements a deep learning architecture, which undergoes continuous training and evaluation using historical datasets 503. The deep learning architecture of the machine learning-based application database configuration generation system 505 includes a CNN model 550 for image feature extraction, a RNN model 552 for sequence modeling, output merging logic 554 for merging the outputs of the CNN model 550 and the RNN model 552, and a fully connected (FC) layer 556 for database configuration prediction.

The CNN model 550 is used to extract visual features from the UI mockup images 510 in the application input 501. The CNN model 550 may include multiple convolutional and pooling layers, which are trained using the historical datasets 503 to recognize patterns and shapes in the UI mockup images 510. The output of the CNN model 550 is a set of feature maps that capture the most salient visual features of the UI mockup images 510. In some embodiments, the CNN model 550 may comprise a pre-trained CNN, such as VGG16 or ResNet50, which is configured to extract visual features from the UI mockup images 510. If using a pre-trained CNN, its final FC layer may be removed and the output of its last convolutional layer may be used as the visual feature representation. This may give, for example, a 7×7×2048 tensor for each of the UI mockup images 510.

The RNN model 552 is used to model the sequence of UI mockup text annotations and labels 512 in the application input 501. The RNN model 552 may include multiple recurrent layers, such as Long Short Term Memory (LSTM) or Gated Recurrent Unit (GRU) layers, which capture the temporal dependencies between the UI mockup text annotations and labels 512. The output of the RNN model 552 is a fixed-length vector that summarizes the sequence of the UI mockup text annotations and labels 512. The RNN model 552 may comprise a bidirectional LSTM that models the sequence of text annotations and labels associated with each UI mockup. The LSTM, for example, may have 128 hidden units, and the output of the LSTM at each time step can be passed through a linear layer to produce a fixed-length vector representation of the sequence.

The output merging logic 554 combines the outputs of the CNN model 550 and the RNN model 552. To do so, the output merging logic 554 may use concatenation, element-wise multiplication operations, combinations thereof, etc. The output merging logic 554 creates a joint feature representation that combines the visual and textual information in the application input 501 (e.g., the UI mockup images 510 and the associated UI mockup text annotations and labels 512). The output merging logic 554 is configured to concatenate the visual feature representation (e.g., from the CNN model 550) and the sequence representation (e.g., from the RNN model 552) to create the joint feature representation. In some embodiments, this gives a 7×7×2048+128=14,080-dimensional feature vector for each UI mockup.

The FC layer 556 may include one or multiple FC layers to make predictions based on the joint feature representation produced by the output merging logic 554. The FC layers learn to map the joint feature representation to an output database schema, which represents the structure of the database for an application based on the application's UI mockup images 510 and associated UI mockup text annotations and labels 512 in the application input 501. The FC layer 556 includes one or multiple FC layers on top of the joint feature representation to make predictions about the structure of the database. For example, two FC layers can be added with 256 hidden units each, followed by a final FC layer with a number of output units corresponding to the number of tables in the application database schema.

Once the deep learning architecture of the machine learning-based application database configuration generation system 505 is defined, the various models and layers (e.g., CNN model 550, RNN model 552, output merging logic 554, FC layer 556) are trained on the historical datasets 503 using a suitable optimization algorithm (e.g., Stochastic Gradient Descent (SGD), Adam, etc.). The historical datasets 503 may be split into a training dataset, a validation dataset, and a test dataset. The training dataset is used for training of the machine learning-based application database configuration generation system 505, and the validation dataset is used to monitor the performance of the machine learning-based application database configuration generation system 505 during training to adjust hyperparameters accordingly. The performance of the machine learning-based application database configuration generation system 505 may be evaluated utilizing the separate test dataset to measure its accuracy and generalization ability.

The historical datasets 503, in some embodiments, are split into the training, validation and test datasets with a ratio of 0.8:0.1:0.1. The training dataset may train the machine learning-based application database configuration generation system 505 using a suitable optimization algorithm, such as Adam, with a cross-entropy loss function. The validation set is used to monitor the performance of the machine learning-based application database configuration generation system 505 during training and to adjust its hyperparameters accordingly. The performance of the machine learning-based application database configuration generation system 505 is evaluated using the testing dataset by measuring the accuracy of predicted database structure schema against ground truth database structure schema.

An example implementation will now be described, where the historical datasets 503 include 1,000 UI mockup images each associated with a set of text annotations and labels describing the intended database configuration. Each UI mockup may be represented as a 256×256 Red, Green, Blue (RGB) image, and the associated text annotations and labels are represented as sequences of tokens. A combination of the CNN model 550 and the RNN model 552 are used to automatically design structured database schemas from the UI mockup images and associated text annotations and labels in the historical datasets 503. This approach can be extended to larger datasets and more complex UI designs, to create a powerful tool for automating database design. As noted above, in some cases the CNN model 550 used may be a pre-trained CNN such as ResNet50, which has a final FC layer which is responsible for classification into a specific set of categories. In the database design context, this classification layer is not needed because an image classification task is not being performed. Instead, the output of an earlier layer (e.g., the output of the last convolutional layer) may be used as the visual feature representation. The pre-trained CNN (e.g., VGG16, ResNet50, etc.) can be used for visual feature extraction. The CNN model 550 will be used as a feature extractor, rather than a classifier. The earlier layers of the CNN model 550 (e.g., before the FC layers) will be used to capture lower-level visual features such as edges, textures and shapes. The final FC layer or layers, which are responsible for classification, can be removed as it is not needed for the database design task. By removing the classification layer of a pre-trained CNN and only using the earlier convolutional layers, the ability of the CNN model 550 to learn meaningful visual representations from the UI mockup images is retained.

Figure 6:
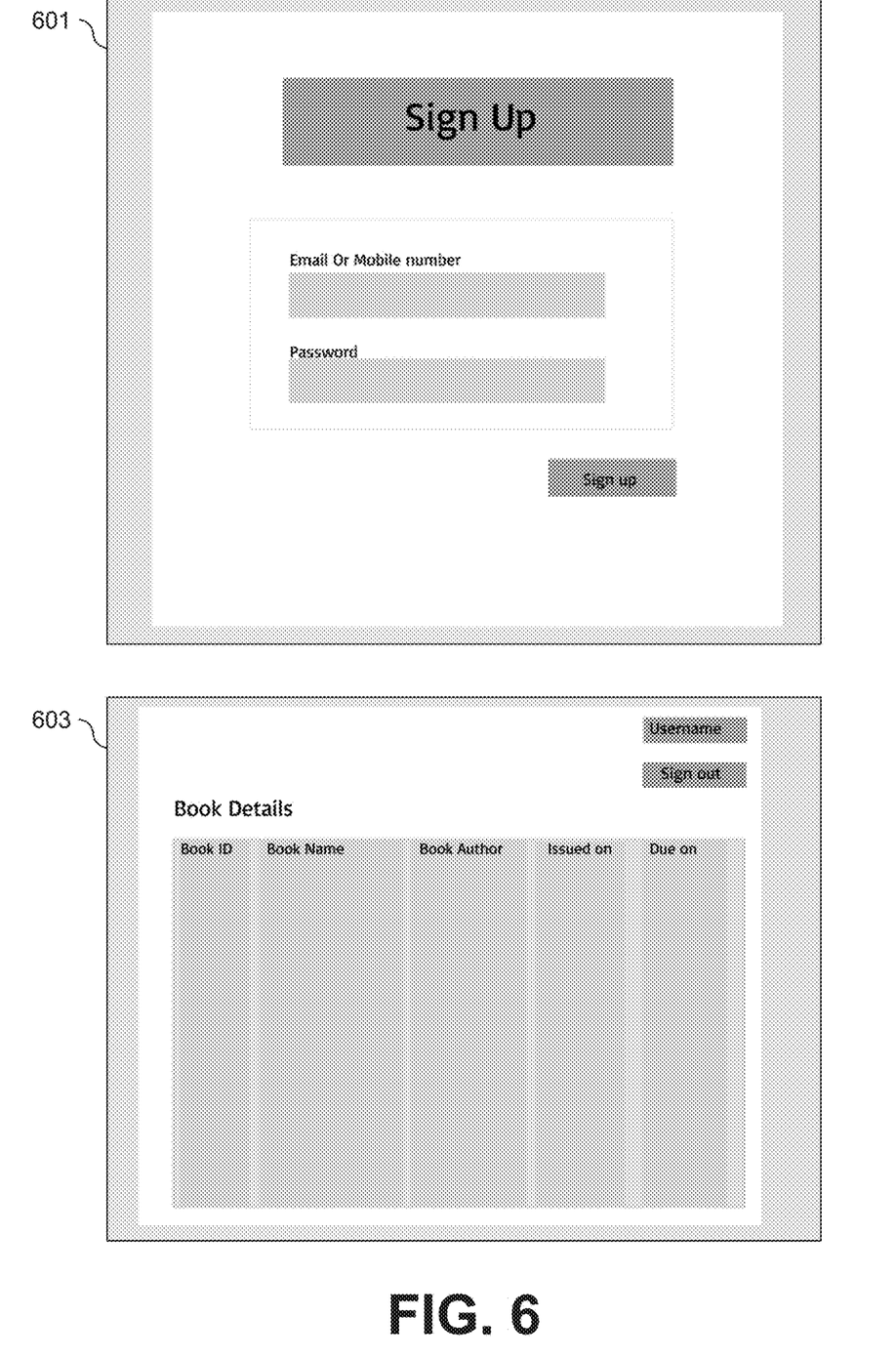
FIG. 6 shows an example of application user interface mockup images in an illustrative embodiment.

FIG. 6 shows UI mockup images 601 and 603, which are two wireframes of a Library Management System application. The overall process involves utilizing machine learning algorithms in a deep learning architecture to extract features and relationships from UI mockups, such as the UI mockup images 601 and 603. The first step involves a user uploading the UI mockup images 601 and 603 into the tool (e.g., the machine learning-based application database configuration generation system 505), which uses the CNN model 550 to perform image feature extraction. In the example of FIG. 6, the CNN model 550 would extract features such as "user_id" and "password" from the UI mockup image 601 (e.g., the "Member Login" UI mockup). The feature vector extracted by the CNN model 550 represents learned visual features from the UI mockup images 601 and 603. During the training phase of the CNN model 550, the CNN model 550 is trained on a labeled dataset to associate specific visual patterns and features with UI component annotations. Additional layers on top of the CNN model 550 may be trained to perform classification or regression tasks, mapping the feature vector to specific UI components or their attributes. Classification tasks may be used to predict the class or category of UI components, while regression tasks can extract properties or values. As the goal is to extract specific attributes or properties of UI components (e.g., such as extracting the "user_id" and "password" fields from the UI mockup image 601), regression models can be trained to predict the values or properties of UI components based on the feature vector.

In some embodiments, the tool (e.g., the machine learning-based application database configuration generation system 505) may provide mechanisms for soliciting feedback from a user based on extracted features. For example, the "user_id" may be extracted as the primary key (PK) and the feedback mechanism may be used to confirm or deny this prediction. The feedback mechanism may also ask the user whether any other details are to be stored for the user-role. Labels are assigned to extracted features to identify the purpose of UI components. For instance, "user_id" and "password" are text fields. The RNN model 552 is used to extract text details from the uploaded UI mockup images 601 and 603. The outputs from the CNN model 550 and the RNN model 552 are merged to create a combined feature list by the output merging logic 554. In the example of the UI mockup image 601, the feature list will include the "user_id" (PK), password, and role. Predicting the relationships between the features involves analyzing the data and identifying patterns or trends that can help explain the relationships between the columns. The data is understood, and correlation analysis is done to identify the relationships between two columns. A regression algorithm can be used to estimate the relationship between one column and another, while a classification algorithm can be used to predict the relationship between categorical variables. The overall deep learning architecture of the machine learning-based application database configuration generation system 505 is trained and evaluated using a selected algorithm, and predictions on the database configuration (e.g., the database structure or schema) for an application is made based on the trained deep learning architecture. Based on the predictions, column relationships and table creation operations for a database may happen, which can be fine-tuned later based on other inputs.

The technical solutions described herein provide an approach for automatically generating a structured database scheme for an application from a UI mockup of the application, along with text annotations and labels associated with the application's UI mockup. Advantageously, the technical solutions reduce the manual effort required for application database design and implementation. The technical solutions combine computer vision and NLP techniques to extract and analyze relevant information from the UI mockup and associated textual annotations and labels, providing a more comprehensive and accurate understanding of the database design. Machine learning algorithms are used to cluster and classify UI components and identify relationships between the UI components, enabling the technical solutions to generate a structured database schema that accurately reflects the UI design of the application.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of database configurations for databases associated with applications will now be described in greater detail with reference to FIGS. 7 and 8. Although described in the context of system 100, these platforms may also be used to implement at least portions of other information processing systems in other embodiments.

Figure 7:
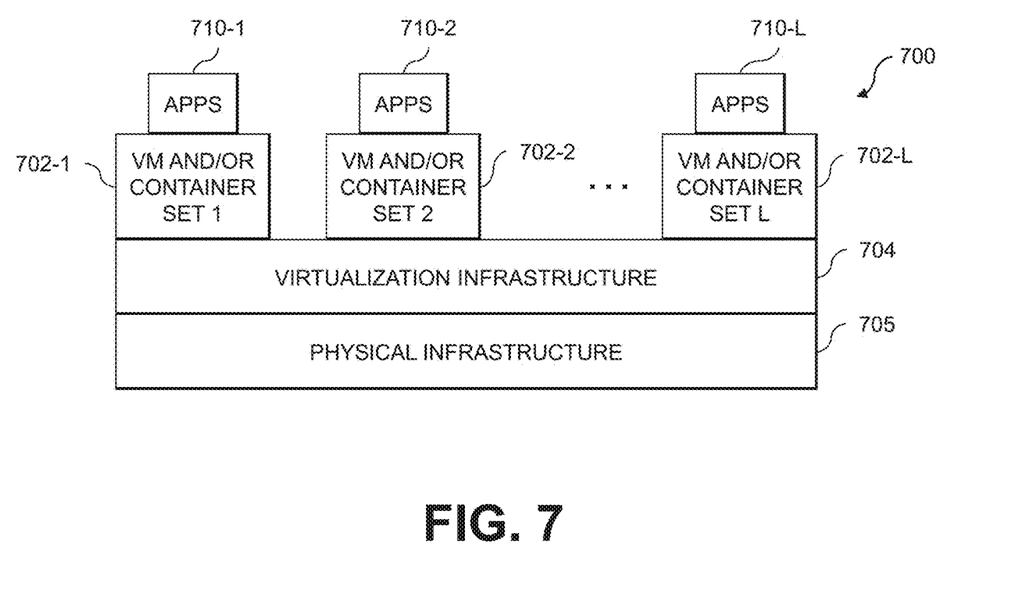
FIGS. 7 and 8 show examples of processing platforms that may be utilized to implement at least a portion of an information processing system in illustrative embodiments.
Figure 8:
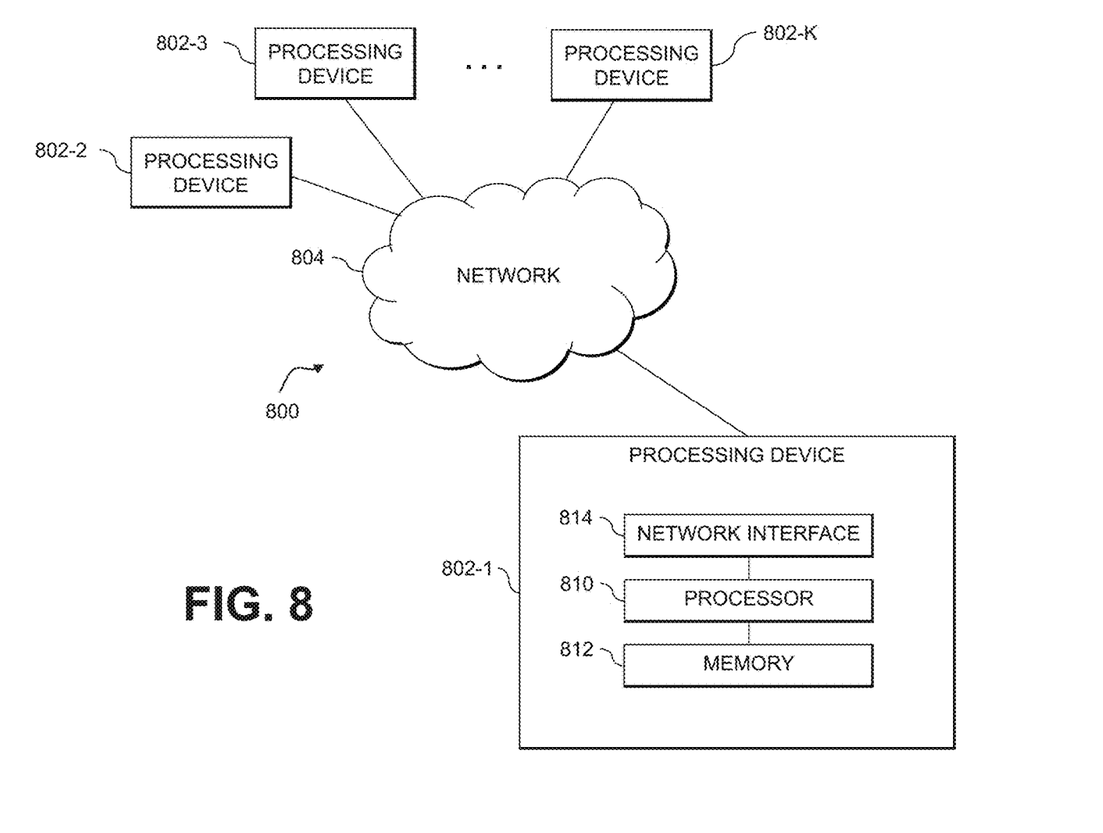

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of database configurations for databases associated with applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to obtain information characterizing a user interface of an application, the obtained information comprising at least one image of at least a portion of the user interface of the application and textual data associated with the user interface of the application;
        to generate, by processing the at least one image utilizing at least a first machine learning model in a machine learning system implemented by the processor and the memory of the at least one processing device, a first data structure characterizing two or more data fields corresponding to user interface components in the user interface of the application;
        to generate, by processing the textual data associated with the user interface of the application utilizing at least a second machine learning model in the machine learning system implemented by the processor and the memory of the at least one processing device, a second data structure characterizing relationships between the two or more data fields corresponding to the user interface components in the user interface of the application;
        to generate a merged output comprising at least a portion of the first data structure generated by processing the at least one image utilizing the first machine learning model and at least a portion of the second data structure generated by processing the textual data associated with the user interface of the application utilizing the second machine learning model;
        to determine, by processing the merged output utilizing at least one machine learning layer of the machine learning system implemented by the processor and the memory of the at least one processing device, a database configuration for a database associated with the application, the database configuration comprising an organization of the two or more data fields into one or more tables; and
        to generate the database associated with the application in accordance with the determined database configuration.

2. The apparatus of claim 1 wherein the at least one image comprises a user interface mockup of the application.

3. The apparatus of claim 1 wherein the textual data associated with the user interface of the application comprises at least one of one or more annotations and one or more labels associated with respective ones of the user interface components in the user interface of the application.

4. The apparatus of claim 3 wherein said at least one of the one or more annotations and the one or more labels are overlayed on a user interface mockup of the application.

5. The apparatus of claim 1 wherein the first data structure characterizes at least one of relationships and relative positions of different ones of the user interface components in the user interface of the application.

6. The apparatus of claim 1 wherein the first machine learning model comprises:
   at least one classifier configured to predict classes of the user interface components; and
   at least one regression model configured to predict properties of the user interface components.

7. The apparatus of claim 1 wherein the first machine learning model comprises a computer vision machine learning model and the second machine learning model comprises a natural language processing machine learning model.

8. The apparatus of claim 1 wherein the first machine learning model comprises a convolutional neural network model.

9. The apparatus of claim 8 wherein the first data structure comprises an output of a convolutional layer of the convolutional neural network model.

10. The apparatus of claim 1 wherein the second machine learning model comprises a recurrent neural network model.

11. The apparatus of claim 10 wherein the recurrent neural network model utilizes at least one of one or more Long Short Term Memory (LSTM) units and one or more Gated Recurrent Units (GRUs).

12. The apparatus of claim 1 wherein determining the database configuration for the database associated with the application comprises processing the merged output utilizing one or more fully connected layers of the machine learning system implemented by the processor and the memory of the at least one processing device.

13. The apparatus of claim 1 wherein generating the merged output comprises concatenating the first data structure and the second data structure.

14. The apparatus of claim 1 wherein generating the merged output comprises performing an element-wise multiplication of first elements of the first data structure and second elements of the second data structure.

15. A computer program product comprising a non-transitory processor-readable storage medium having stored therein program code of one or more software programs, wherein the program code when executed by at least one processing device causes the at least one processing device:
   to obtain information characterizing a user interface of an application, the obtained information comprising at least one image of at least a portion of the user interface of the application and textual data associated with the user interface of the application;
   to generate, by processing the at least one image utilizing at least a first machine learning model in a machine learning system implemented by the at least one processing device, a first data structure characterizing two or more data fields corresponding to user interface components in the user interface of the application;
   to generate, by processing the textual data associated with the user interface of the application utilizing at least a second machine learning model in the machine learning system implemented by the at least one processing device, a second data structure characterizing relationships between the two or more data fields corresponding to the user interface components in the user interface of the application;
   to generate a merged output comprising at least a portion of the first data structure generated by processing the at least one image utilizing the first machine learning model and at least a portion of the second data structure generated by processing the textual data associated with the user interface of the application utilizing the second machine learning model;
   to determine, by processing the merged output utilizing at least one machine learning layer of the machine learning system implemented by the at least one processing device, a database configuration for a database associated with the application, the database configuration comprising an organization of the two or more data fields into one or more tables; and
   to generate the database associated with the application in accordance with the determined database configuration.

16. The computer program product of claim 15 wherein the first machine learning model comprises a computer vision machine learning model and the second machine learning model comprises a natural language processing machine learning model.

17. The computer program product of claim 15 wherein determining the database configuration for the database associated with the application comprises processing the merged output utilizing one or more fully connected layers of the machine learning system implemented by the processor and the memory of the at least one processing device.

18. A method comprising:
   obtaining information characterizing a user interface of an application, the obtained information comprising at least one image of at least a portion of the user interface of the application and textual data associated with the user interface of the application;
   generating, by processing the at least one image utilizing at least a first machine learning model in a machine learning system, a first data structure characterizing two or more data fields corresponding to user interface components in the user interface of the application;
   generating, by processing the textual data associated with the user interface of the application utilizing at least a second machine learning model in the machine learning system, a second data structure characterizing relationships between the two or more data fields corresponding to the user interface components in the user interface of the application;
   generating a merged output comprising at least a portion of the first data structure generated by processing the at least one image utilizing the first machine learning model and at least a portion of the second data structure generated by processing the textual data associated with the user interface of the application utilizing the second machine learning model;
   determining, by processing the merged output utilizing at least one machine learning layer of the machine learning system, a database configuration for a database associated with the application, the database configuration comprising an organization of the two or more data fields into one or more tables; and
   generating the database associated with the application in accordance with the determined database configuration
   wherein the method is performed by at least one processing device comprising a processor coupled to a memory, the at least one processing device implementing the machine learning system.

19. The method of claim 18 wherein the first machine learning model comprises a computer vision machine learning model and the second machine learning model comprises a natural language processing machine learning model.

20. The method of claim 18 wherein determining the database configuration for the database associated with the application comprises processing the merged output utilizing one or more fully connected layers of the machine learning system.

\* \* \* \* \*